United States Patent [19]

Ogawa et al.

[11] Patent Number: 4,744,033
[45] Date of Patent: May 10, 1988

[54] ELECTRONIC DISPLAY SYSTEM

[75] Inventors: Michima Ogawa, Nagoya; Toshio Yasui, Anjo; Kenzo Ito, Okazaki, all of Japan

[73] Assignee: Nippondenso Co., Ltd., Kariya, Japan

[21] Appl. No.: 857,172

[22] Filed: Apr. 29, 1986

[30] Foreign Application Priority Data

Apr. 30, 1985 [JP] Japan ................................ 60-94615

[51] Int. Cl.$^4$ ............................................. G06F 15/50
[52] U.S. Cl. .................................... 364/443; 364/449; 340/990; 340/995
[58] Field of Search ............... 364/424, 443, 449, 521, 364/444; 73/178 R; 340/988, 990, 995; 342/450-452

[56] References Cited

U.S. PATENT DOCUMENTS

| | | | |
|---|---|---|---|
| 4,504,913 | 3/1985 | Miura et al. | 364/449 |
| 4,511,973 | 4/1985 | Miura et al. | 364/449 |
| 4,532,514 | 7/1985 | Hatano et al. | 340/995 |
| 4,543,572 | 9/1985 | Tanaka et al. | 364/449 |
| 4,638,438 | 1/1987 | Endo et al. | 364/449 |
| 4,675,676 | 6/1987 | Takanabe et al. | 340/995 |

Primary Examiner—Gary Chin
Attorney, Agent, or Firm—Cushman, Darby & Cushman

[57] ABSTRACT

In an electronic map display system, predetermined linear display object data of all map data are stored in a first memory according to a predetermined coordinate system. Target point data other than the predetermined linear display object data are stored in a second memory in accordance with a relative coordinate system based on the predetermined linear objects. The data of the first memory are converted into display data of designated magnification rate by a first converter. The target point data of the second memory are converted into display data in accordance with a coordinate system based on the linear display objects by a second converter. A display signal is produced to display a map image in accordance with the data converted by the first and second data converters.

5 Claims, 18 Drawing Sheets

F I G. 5a
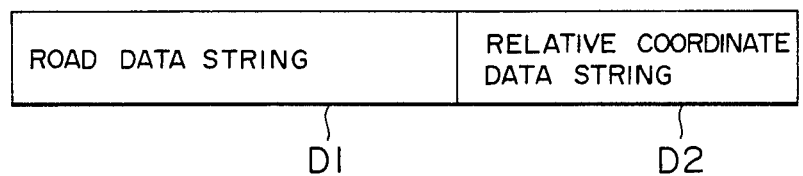

|  (X₁,Y₁) \ (X₂,Y₂) | O | I | II | III | IV | V | VI | VII | VIII |
|---|---|---|---|---|---|---|---|---|---|
| O | × | × | × | × | ○ | ○ | × | ○ | ○ |
| I | × | × | × | ○ | ○ | ○ | ○ | ○ | ○ |
| II | × | × | × | ○ | ○ | × | ○ | ○ | × |
| III | × | ○ | ○ | × | ○ | ○ | × | ○ | ○ |
| IV | ○ | ○ | ○ | ○ | ○ | ○ | ○ | ○ | ○ |
| V | ○ | ○ | × | ○ | ○ | × | ○ | ○ | × |
| VI | × | ○ | ○ | × | ○ | ○ | × | × | × |
| VII | ○ | ○ | ○ | ○ | ○ | ○ | × | × | × |
| VIII | ○ | ○ | × | ○ | ○ | × | × | × | × |

ELECTRONIC DISPLAY SYSTEM

BACKGROUND OF THE INVENTION

The present invention relates to an electronic display system for visually displaying map data stored, or more in particular to an electronic display system suitable for use on an automobile or the like.

Conventionally, a device called an electronic map display system has been used. Such device allows a necessary map to be rapidly searched for, and is used by an automobile driver who is lost, to enable him to reach his destination.

In such a system, required map data on given areas are stored in a large-capacity memory means, such as a magnetic disc or optical disc. By designating the area around the automobile with a select switch or the like, the map thereof is displayed on CRT or the like.

The data memory system for this display is generally limited to the image pattern system in which the image of a map is stored as is. A map image, for example, is subdivided and each subdivided unit is stored as an item of digital information in an arrangement corresponding to the map coordinates thereof.

The image pattern system, however, has the disadvantages of an increased amount of stored data and the fixed form of expression, thereby making it an unsuitable application for enlarged or shrunken expression. For this reason, a data storage system of structured type in place of the image pattern system is under development.

In the structured data storage system, each element of a map is expressed in a predetermined coordinate system. A road, for instance, is expressed in a rectangular coordinate system as points at regular intervals of distance.

The shrinking process of structured data, however, sometimes results in an inaccurate display as a map.

In the shrinking process for a road, for instance, all the data making up the road are not used. Typically, one half or fewer of the points are used, so that the coordinates of these points are connected and displayed. A possible result can be seen when it is intended to shrink a detailed picture like FIG. 13a to the one shown in FIG. 13b with fewer data (r1, r2). For instance, the point PO, which may be a filling station on the roadside and located accurately on the coordinate system as a whole, may be inconveniently relocated to the opposite side of the road by the shrinking process.

If a mark or target is relocated to the opposite side of a road on the display because of the magnification rate as discussed above, a great inconvenience is imposed on the vehicle driver looking for a mark to reach it. The driver, almost unable to closely watch both sides of a road while at the wheel, may overlook the mark.

In a similar manner, a mark distant from a road, such as a golf course, is relocated to a point different in distance from the road. The resultant inaccurate relative distance from the road in a displayed map is likely to cause the driver to make an unnecessary detour.

SUMMARY OF THE INVENTION

The object of the present invention is to obviate the abovementioned problems and to realize an electronic map display system for indicating an accurate direction and position of a mark like a road.

According to the present invention, there is provided, as shown in FIG. 1, an electronic map display system for displaying a given stored map data visually as a map image, by converting it into display data magnified at a designated rate. The device includes visual display means M1 capable of visually displaying an image, first memory means M2 which stores predetermined linear display data of a map in accordance with a predetermined coordinate system, second memory means M3 for storing predetermined data other than the predetermined linear display data in accordance with a relative coordinate system with reference to the linear display, first data converter means M4 for converting the data of the first memory means into display data of designated magnification, second data converter means M5 for converting the data of the second memory means M3 into display data in accordance with a coordinate system with reference to the linear display indicative of the display data, and display control means M6 for displaying a map image corresponding to the data converted by the first data converter means M4 and the second data converter means M5 on the visual display means M1.

The visual display means M1 includes a CRT, liquid crystal display screen or the like which can reproduce a map visible to the human eyes.

The first memory means M2 includes a plurality of data representing the display contents of elements of predetermined linear display objects making up a map to be displayed as a map image. The linear display objects mainly include traffic routes such as roads and railways, to which sea coast lines and river bank lines also belong. The data of these display objects are expressed in a predetermined coordinate system, such as a rectangular coordinate or a geographic coordinate system, with the X-axis running from east to west and the Y-axis running from south to north. For storage purposes, intersections are used as reference points and stored in the geographic coordinate, and data between points are stored only as a connection or coordinate values are stored at regular intervals for each display object. This first memory means M2 is realized by such means as a magnetic disc, optical disc, magnetic tape, random access memory (RAM), or read only memory (ROM).

The second memory means M3, on the other hand, covers a plurality of data indicating the contents of predetermined elements other than the predetermined linear display objects making up a map to be displayed as a map image. This data does not use the coordinate system providing a reference for the linear display object data of the first memory means M2, but is stored in a coordinate system based on the linear display objects as a reference.

As shown in FIG. 2, for instance, assume that a target P1 is located on the right side of a road between intersections a1 and b1 at a point distance by l1 from a1. The coordinate of the target object P1 is expressed as a vector flag Fv=0 indicating the distance l1 along the road and the right or left side thereof. If the intersection b1 is used as a reference point, the target is given by the vector flag Fv=1 and the distance l2 along the road.

In the case where a target is not located on the side of a road, on the other hand, two reference roads nearest to the target are selected as coordinate axis as shown in FIG. 3, for example, and the position of the target P32 is expressed with the intersection a2 thereof as an origin. In this case, the value of the axis a2-c2 is "11.2" and the value of the axis a2-b2 is "8.6", so that the target is indicated as P2(11.2, 8.6).

This second memory means M3 is realized, like the first memory means M2, by a magnetic disc, an optical disc, a magnetic tape, RAM, ROM or the like.

The first converter means M4 computes and converts the data required for display or a designated magnification rate, which is read out of the first memory means M2 in compliance with the designation on the basis of an internal processing or an external designation and displayed in a coordinate, into a display data of a predetermined magnification rate. The first data converter means M4 is comprised of, for example, an electronic circuit such as a computer.

The second data converter means M5 reads data group of predetermined elements other than the predetermined linear display objects required for display of the designated contents out of the second memory means M3 in accordance with a designation, and computes and converts a display position of data other than the predetermined linear display objects in a coordinate system having coordinate axis in the predetermined linear display objects converted by the first data converter means M4 and expressed as a display data, for displaying data other than the predetermined linear display objects. The second data converter means M5 includes an electronic circuit such as a computer.

The display control means M6 superposes images generated from the data selectively changed by the first data converter means M4 and the second data converter means M5, for display on the visual display means M1. The display control means M6 includes, for example, an electronic circuit such as what is called a CRT controller.

(Functions)

The data on the predetermined linear display objects of that first memory means M2 are appropriately selected in accordance with the enlargement or shrinking by the first data converter means M4, and directly displayed on the visual display means M1 through the display control means M6.

The data of predetermined elements other than the predetermined linear display objects stored in the second memory means M3, on the other hand, are converted into display data by the second data converter means M5 with reference to the display data of the predetermined linear display objects computed at the first data converter means M4 from the data expressed in a relative coordinate system thereof. This display data are superimposed on the display data of the predetermined linear display objects and displayed on the visual display means M1. In this way, accurate display of relative positions against the predetermined linear display objects is made possible.

According to the present invention, there is provided an electronic map display system, in which map data are stored in a relative coordinate system based on predetermined linear display objects included therein and each data is displayed in a reference coordinate system including the displayed linear display objects, so that even if the map is enlarged or shrinked, or the detail of the display is changed, the accurate position of a mark can be indicated as viewed from a road or the like, making it possible for the driver or the like to reach his target point without error.

BRIEF DESCRIPTION OF THE DRAWINGS

FIG. 5a is a diagram showing a memory structure of the memory unit.

DESCRIPTION OF THE PREFERRED EMBODIMENTS

An electronic map display system according to an embodiment of the present invention will be explained below with reference to FIG. 4 and succeeding drawings.

Figure 4:
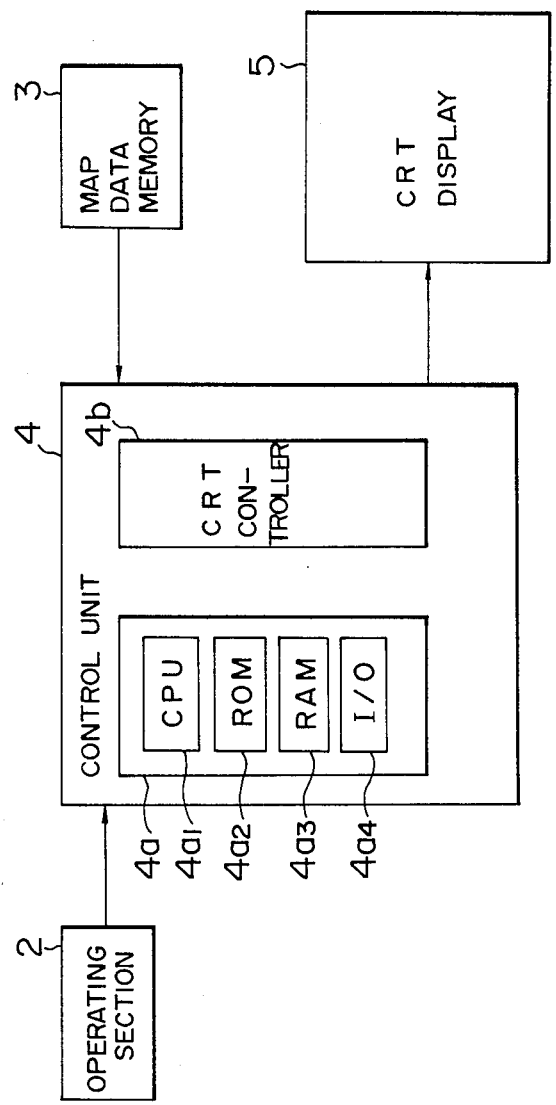
FIG. 4 is a block diagram showing an embodiment of the present invention.

A block diagram of an embodiment is shown in FIG. 4. In FIG. 4, reference numeral 2 designates an operating section used by the driver or the like in operating an electronic map display system. Numeral 3 designates a map data memory unit which functions as the first memory means M2 and the second memory means M3 at the same time for storing predetermined map data in advance. Numeral 4 designates a control unit which functions both the first data converter means M4 and the second data converter means M5 at the same time. The control unit 4 includes a microcomputer 4a having a CPU 4a1, an ROM 4a2, an RAM 4a3, I/O 4a4 and the like, and a display controller 4b having the functions of the display control means M6 for performing the functions of computation and display control. Numeral 5 designates a CRT display which works as a visual display means M1. The predetermined linear display objects in this case are made up of roads.

The operating section 2 includes a select key for selecting an area to be displayed, an enlargement key for instructing the currently displayed map to be enlarged by one rank, a shrink key for shrinking the currently displayed map by one rank, and a density key for making the currently displayed map more dense by one rank.

The RAM 4a3 of the microcomputer 4a of the control unit 4 is provided with a RAM (VRAM) and is for direction indication of the contents of the display on the CRT display 5. The display controller 4b makes direct access to this VRAM area and displays it in a ratio of 1 to 1 on the CRT display 5. Also, another VRAM area is provided for character data, so that the characters corresponding to the codes written in the VRAM are displayed on the CRT display unit 5.

The map data memory unit 3 includes an optical disc memory for digitally storing map data. The data are read by laser beam immediately as required, and transmitted to the control unit 4 where they are processed appropriately.

The data contained in the optical disc, as shown in FIG. 5a, a road data string D1 as the required linear display object data to be stored in the first memory means M2 and a relative coordinate data string D2 of map elements other than roads as data to be stored in the second memory means M3.

Figure 5B:
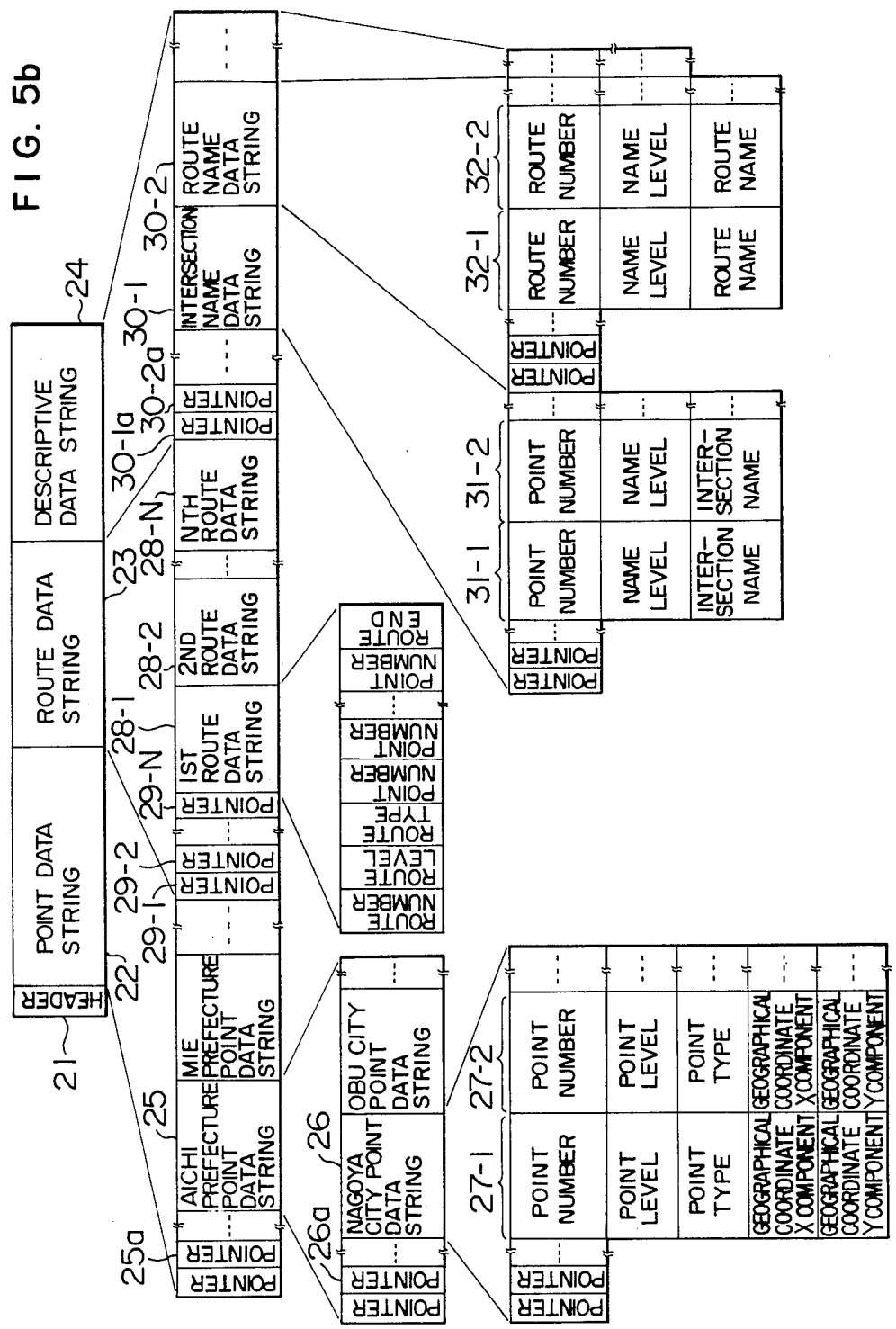
FIG. 5b is a diagram showing a memory structure of a road data string thereof.

The road data string D1, as shown in FIG. 5b, for example, includes a header 21 providing an identification code for a local structured map data, a point data string 22 relating to such points as main intersections, a route data string 23 relating to the routes including national highways, and a descriptive data string 24 relating to various services. The point data string 22 includes prefectural point data strings 25 for the locality concerned such as the Aichi Prefectural point data string relating to Aichi Prefecture and a pointer 25a thereof. The Aichi Prefectural point data string included in the prefectural point data strings, for example, city point data strings 26 for the prefecture involved such as the Nagoya City point data string relating to Nagoya City belonging to Aichi Prefecture and a pointer 26a thereof. Among the city point data strings 26, on the other hand, the Nagoya City point string, for instance, includes a plurality of point data 27-1, 27-2, relating to main points belonging to Nagoya City. Each of the point data 27-1, 27-2 and so on, on the other hand, has such data as a point number, a point level, a point type, and the X and Y components of the geographical coordinate of the particular point. The route data string 23 includes the 1st route data string 28-1, second route data string 28-2, . . . , N-th route data string 28-N and pointers 29-1 to 29-N corresponding to the route data strings in one-to-one relationship. Each of the route data strings 28-1 to 28-N includes a route number, a route level, a route type, point numbers of the points making up the route and a route end identification data. The descriptive data string 24 includes an intersection name data string 30-1, a route name data string 30-2 and so on, and pointers 30-1a, 30-2a and so on corresponding one-to-one to the name data strings 30-1, 30-2 and so on. The intersection amine data string 30-1 includes a plurality of intersection data 31-1, 31-2 and so on with the point number, name level and intersection name, while the route name data string 30-2 includes a plurality of route data 32-1, 32-2 and so with on the route number, name level and route name.

The route types include the national roads, free ways, ordinary roads, railways, cast lines and other types of routes, while the point types represent ordinary intersections, grade separations ordinary roads, interchanges, crossings of ordinary roads and free ways, crossings of ordinary roads and railways, and other types of points.

Figure 5C:
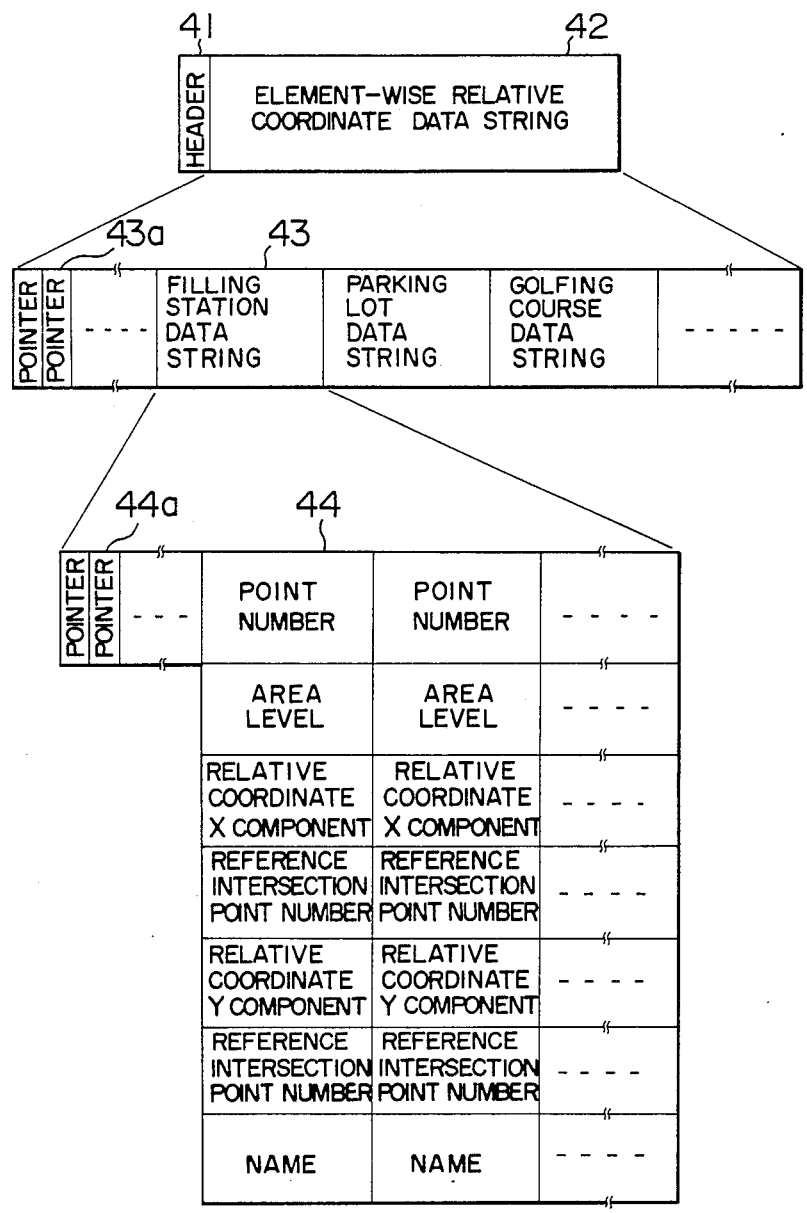
FIG. 5c is a diagram showing a memory structure of a relative coordinate data string thereof.

The relative coordinate data string D2, on the other hand, as shown in FIG. 5c, include a header 41 providing an identification code of the relative coordinate data strings and an element relative coordinate data string 42. The element relative coordinate data string 42 includes a data string 43 by element such as a filling station, a parking lot or a golfing course and a pointer 43a by element for recording the data start address of each element. Further, the data string for each element such as a filling station includes the point number assigned to each filling station, the area level indicating whether the areas is to be displayed or not, X component of the relative coordinate, the two intersection point numbers indicating the road section corresponding to the X axis of the X component, the two intersection point numbers indicating the road section corresponding to the Y axis of the Y component, the data string 44 of the name of the filling station, and the point pointer 44a for recording the data start address of each filling station.

Figure 1:
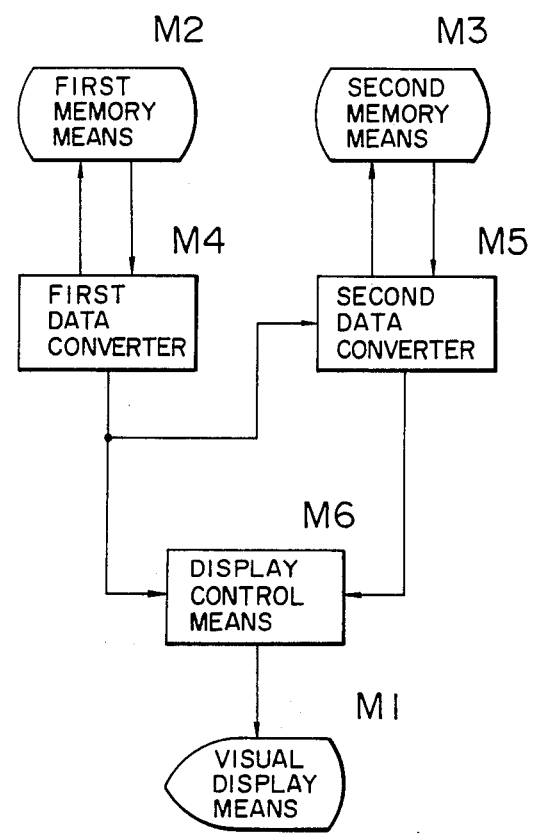
FIG. 1 is a block diagram showing a basic configuration of the present invention.
Figure 2:
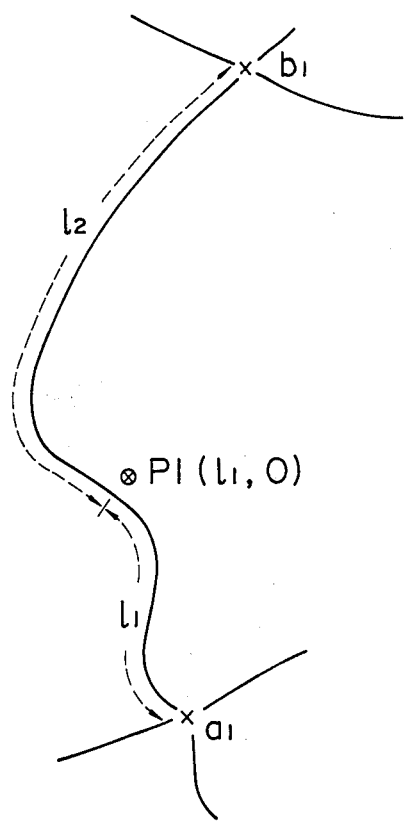
FIG. 2 is a diagram for explaining an example of the processing according to the present invention.

The above-mentioned data are described in the X-Y coordinate system. If a position is indicated by a vector representing the distance on a specific road and the right or left side of the road as shown in FIG. 2, however, the value of the vector graph Fv may be used instead of the Y component, and the reference intersection point number of the Y component may not be stored.

Figure 6:
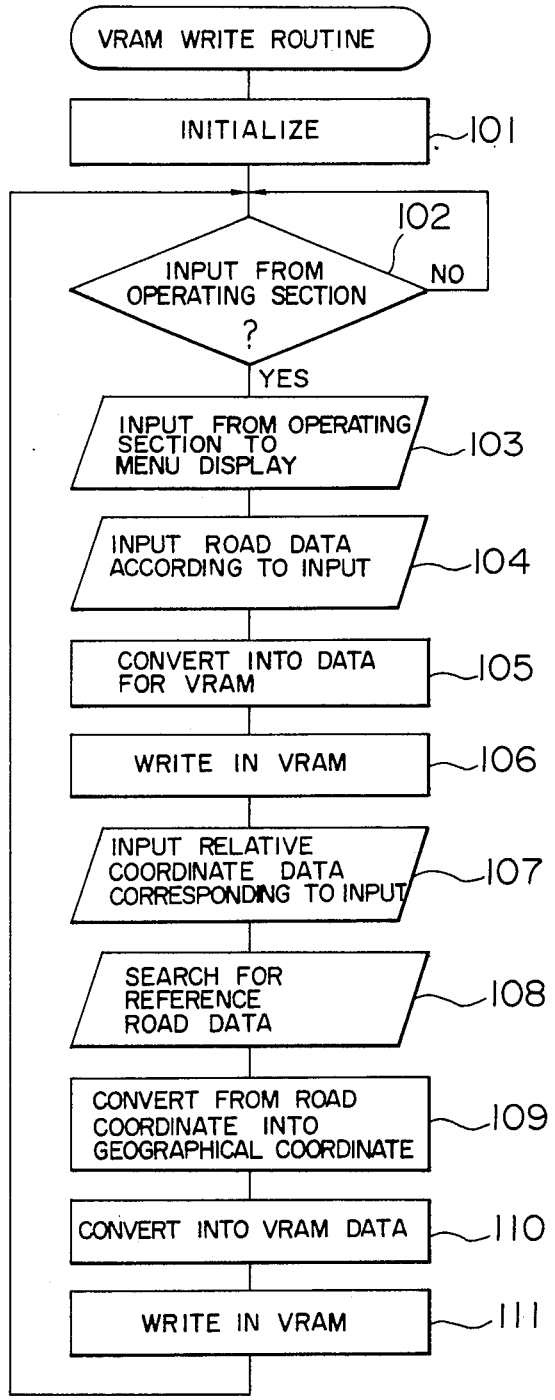
FIG. 6 is a basic flow chart used for control effected in an embodiment.

The processing executed by the control unit 4 will be explained with reference to the flowchart of FIG. 6.

Initially, variables, flags and the like are cleared or set to the initial values at the step 101. Then, at the step 102, it is decided whether an input "Set the display" has been applied from the operating section 2 or not. If there is no such input, a waiting loop is entered to wait for the input.

If the input is applied, the process transfers to the step 103 where a menu for display area selection is displayed and a signal is applied from the operating section 2 for the menu. The menu, for instance, is indicated in the form of the DISTRICT, PREFECTURE, CITY and so on in that order, so as too allow selection them in the same order.

Next, the process passes to the step 104 where the road data of the area corresponding to the input from the operating section 2 is read from the memory 3. At the step 105, the contents of the display between the points is computed, and the geographical coordinate is converted into the display digital data. Next, at the step 106, the data is directly written in the VRAM.

The contents read by the display controller 4b and displayed on the CRT display 5 is a map displaying roads alone. That is, landmarks such as filling stations or golf courses are not included. This condition is instantaneous.

At the step 107, the relative coordinate data of the area corresponding to the input of the operation section 2 is applied. At the step 108, the road data string D1 is searched for the road data making up reference coordinate axis for each data. At the step 109, the road of the coordinate axis of each data is determined from the road data thus searched written in the VRAM. In accordance with the shape of the road, the relative coordinate is computed to be converted into the geographical coordinate. At the step 110, the geographical coordinate is converted into the VRAM display data. At the step 111, these data are written in the VRAM. The VRAM has already a map of the roads alone written therein, and data on the filling stations and the like are overwritten. In this way, all the map elements are written in the VRAM, so that a complete map is displayed on the CRT display unit 5 by the display controller 4b.

The process then returns to the step 102 to repeat a similar operation. If these is no input from the operating section 2 at the step 102, the display condition mentioned above is held.

Then, in the above-mentioned flowchart, an example of the detailed processing for the steps 104, 105 and 106 will be explained with reference to the flowchart of FIG. 7a.

The step 201 is executed to read out the content of the leading pointer 29-1 in the route data string 23 of the map data memory unit 3.

Then, the step 202 is performed to decide whether or not the content of 29-1 to 29-N has all been read out.

At this time point, the content of the leading printer 29-1 has just been read out, and the decision is NO, so that the step 203 is executed next.

The step 203 reads out the route level data of the i-th route data string (first route data string 28-1) designated by the i-th pointer (the leading pointer 29-1 in this case). In this process, the route level data is the relative degree of importance assigned to each route.

Then, the step 204 is executed to determine whether or not the route level is displayable, that is to say, whether the i-th route (first route) has the degree of importance to be displayed against the size designated as above.

If the i-th route (first route) is the one that need not be displayed, the step 205 is executed to update the pointer, that is to say, the next pointer (second pointer 29-2) is read and the process is returned to the step 202.

If the i-th route (first route) is the one to be displayed, on the other hand, the step 206 is executed to read the route type data of the i-th route data string (first route data string 28-1).

Next, the step 207 is executed to read out the point number data (the leading point number data at this time point) of the i-th route data string (first route data string 28-1).

Then, the step 208 is executed, and it is determined whether or not the route end data of the i-th route data string (first route data string 28-1) has been read or not. At this time point, the leading point number data has just been read out, and therefore the decision is NO, so that the next step 209 is executed to read out the point level data assigned to the point number in the point data string 22 coincident with the particular point number (leading point number), thus deciding whether or not the particular point has the degree of importance worth displaying against the size designated as above. The above-mentioned point level data is already selected from the input of the menu in the step 103 shown in FIG. 6.

If this point is the one that need not be displayed, the process is returned to the step 207 to read the next point number in the i-th route data string (first route data string 28-1).

If this point is the one to be displayed, by contrast, the step 210 is executed to decide whether or not it is the first point number extracted in the i-th route data string (first route data string 28-1).

Since the first point number is involved at this time point, the decision is YES, and the steps 211 to 214 are executed to read out the X and Y components of the geographical coordinate of this point. This geographical coordinate point (X,Y) is converted into the display coordinate point $(X_1, Y_1)$ and further the area A is determined which the display coordinate point $(X_1, Y_1)$ belongs to.

Figure 8A:
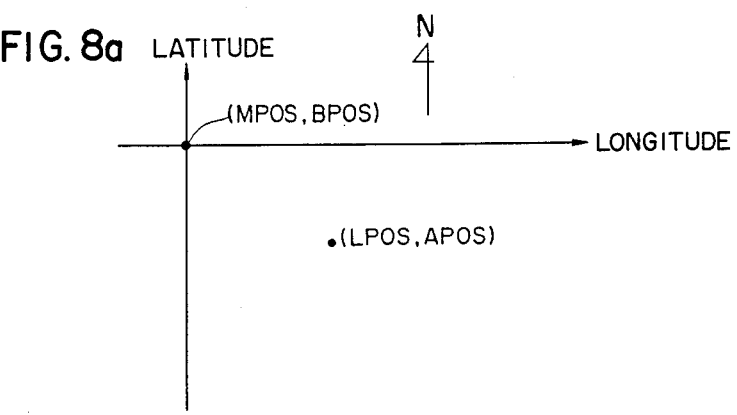
FIGS. 8a and 8b are diagrams for explaining the coordinate conversion from the geographical coordinate system into the surface coordinate system.
Figure 8B:
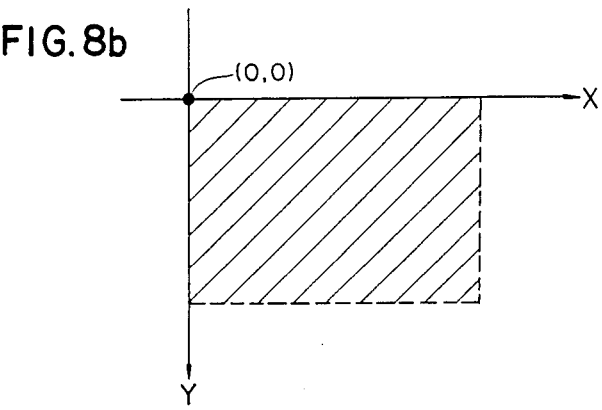

This coordinate conversion processing is such that, as shown in FIG. 8a showing the geographical coordinate system and FIG. 8b showing the display coordinate system, (21) the point (MPOS, BPOS) is obtained which corresponds to the geographical coordinates of the geographical coordinate system having one-to-one correspondence of the origin (0,0) of the hatched area of the display coordinate system (corresponding to the map display area of the CRT display 5), and then (2) in accordance with the obtained point (MPOS, BPOS) the geographical coordinates (LPOS, APOS) of the point in question are converted to the corresponding point $(X_1, Y_1)$ of the display coordinate system.

Figure 9A:
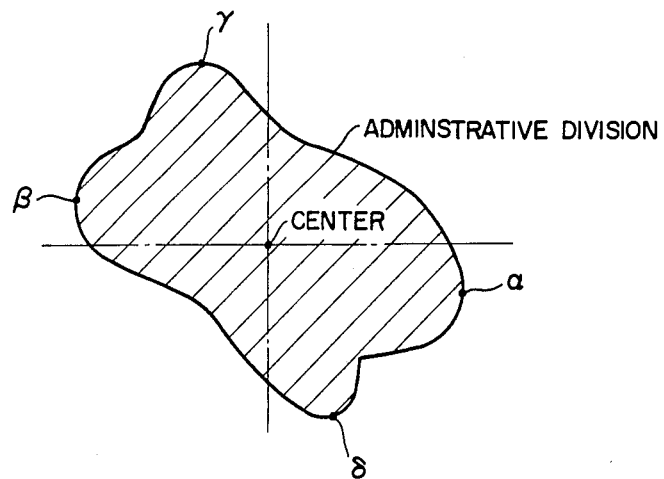
FIGS. 9a and 9b are diagrams for explaining a method of determining a geographical coordinate (MPOS,BPOS) corresponding to the origin (0,0) of the map display screen.
Figure 9B:
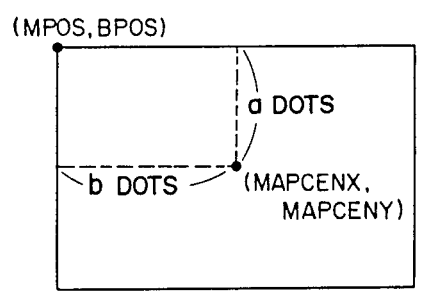

In this case, the point (MPOS, BPOS) is obtained in the following way: Firstly, the present position or the center point (FIG. 9a) of an administrative section point group in the case of an administrative section selection, is determined as the displayed map center coordinates (MAPCENX, MAPCENY) of the geographical coordinate system and then the point (MPOS, BPOS) is obtained from the following equations using as parameters the coordinate data MAPCENX and MAPCENCY, the numbers of dots a and b of the map display screen of the CRT display 1 (FIG. 9b) and the number of dots LDOT per unit longitude and the number of dots ADOT per unit latitude which are determined in accordance with the selected size MPOS = MAPCENX − b/LDOT BPOS = MAPCENY + a/ADOT Then, the point (X,Y) is determined by the following equations $X_1$ = (LPOS − MPOS) × LDOT $Y_1$ = (BPOS − APOS) × ADOT By the way, the coordinate of the central point of the map designating an administrative section in FIG. 9a is obtained by the equations below from the geographical coordinate of the four points (α, β, γ, δ) including the east, west, north and south ends of the administrative section.

MAPCENX = (Longitude of east end − Longitude of west end)/2

MAPCENY = (Latitude of north end − Latitude of south end)/2

Figures 10A, 10B:
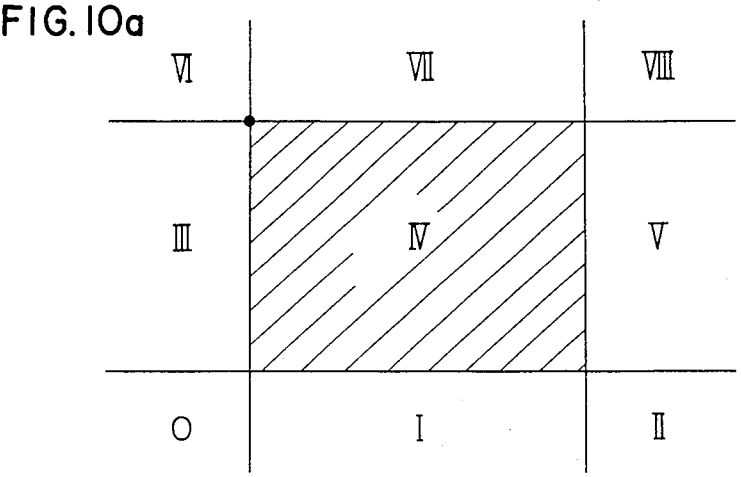
FIGS. 10a and 10b are diagrams for explaining the conditions for connection of two points in the surface coordinate system.

On the other hand, the above-mentioned area determination processing is performed by determining that the display coordinate point $(X_1, Y_1)$ obtained by the previously mentioned coordinate conversion process belongs to one of the areas O to VIII divided as shown in FIG. 10a. In the case of FIG. 10a, the area IV corresponds to the hatched area shown in FIG. 8b or the map display area.

When the area A to which the display coordinate point $(X_1,Y_1)$ belongs is obtained at the step 214, a return is made to the step 207 and the next point number of the i-th route data string (the first route data 181) is read out.

Then, the step 208 is performed to determine whether the route is ended. If it is not, then the step 209 is performed to determine whether the point level of this point number is a display enable level. If it is not, then a return is made to the step 207. If it is the display enable level, then the step 210 is performed to determine whether this point number is the one extracted for the first time for the i-th route data string (the first route data string 28-1).

Since the first point number has already been extracted by this time, the decision results in NO and then steps 215 to 218 are performed in this order thereby performing the similar process as the steps 211 to 214. In other words, the geographical coordinates $(X,Y)$ of this point number (the j-th point number) are converted to the corresponding display coordinates $(X_2,Y_2)$ belong is determined.

Then, a step 219 is performed to make a decision as to whether the connection between the point $(X_1,Y_1)$ and the point $(X_2,Y_2)$ is to be displayed, that is, whether there is a specified relation between the areas A and B. As will be seen from FIGS. 10a and 10(b), if, for example, the display coordinates $(X_1,Y_1)$ belong to the area 0 and the other display coordinates $(X_2,Y_2)$ belong to any one of the areas O, I, II, III and VI, the decision process determines that there is no specified relation (this is indicated by a mark X in FIG. 10b. If the display coordinates $(X_1,Y_1)$ belong to the area 0 and the other display coordinates $(X_2,Y_2)$ belong to any one of the areas IV, V, VII and VIII, then it is determined that there is the specified relation (this is indicated by a mark O in FIG. 7b). The decisions on the other combinations become as shown in FIG. 10b.

If there is no specified relation between the areas A and B, then steps 220 and 221 are performed so that an area updating process of changing the area A to the area B and a coordinate updating process of changing the coordinates $(X_1,Y_1)$ to the coordinates $(X_2,Y_2)$ are performed and a return is made to the step 107.

On the other hand, if there is the specified relation, then a step 222 is performed so that the corresponding address of VRAM is computed and the line connecting the point $(X_1,Y_1)$ and the point $(X_2,Y_2)$ is displayed on the display screen in accordance with the type of the route. In other words, if the i-th route (thee first route) is a national road, the route is displayed with an increased brightness as compared with the other routes. Then, the steps 220 and 221 are performed to effect the area updating process and the coordinate updating process and a return is made to the step 207.

Thereafter, so long as the end of route is not read out, the route including the steps 207, 208 and 209 and the route including the steps 207, 208, 209, 210 and 215 to 222 (the steps 222 is omitted as occasion demands) are selectively performed thus making the required route displays for the i-th route (the first route).

When the end of route is read out for the i-th route (the first route) so that the decision of the step 208 changes to YES, the step 205 is performed and the pointer updating processing is performed. Thus, the processing for the next route (the second route) is performed in the like manner as in the case of the first route.

Figures 1, 7A:
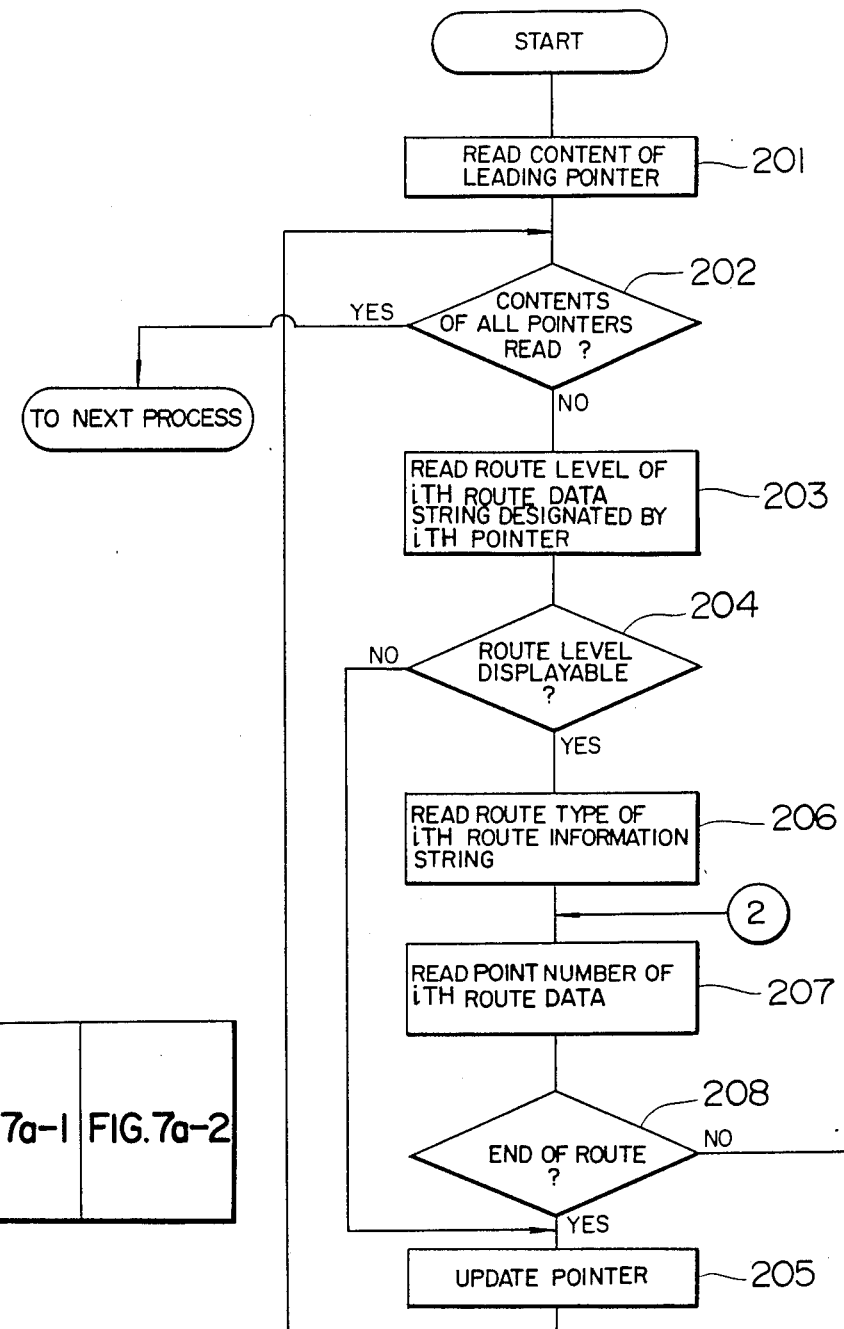
FIG. 7a is a flow chart for selecting, and converting by computation the required data from a part of the road data string.
Figures 2, 7A:
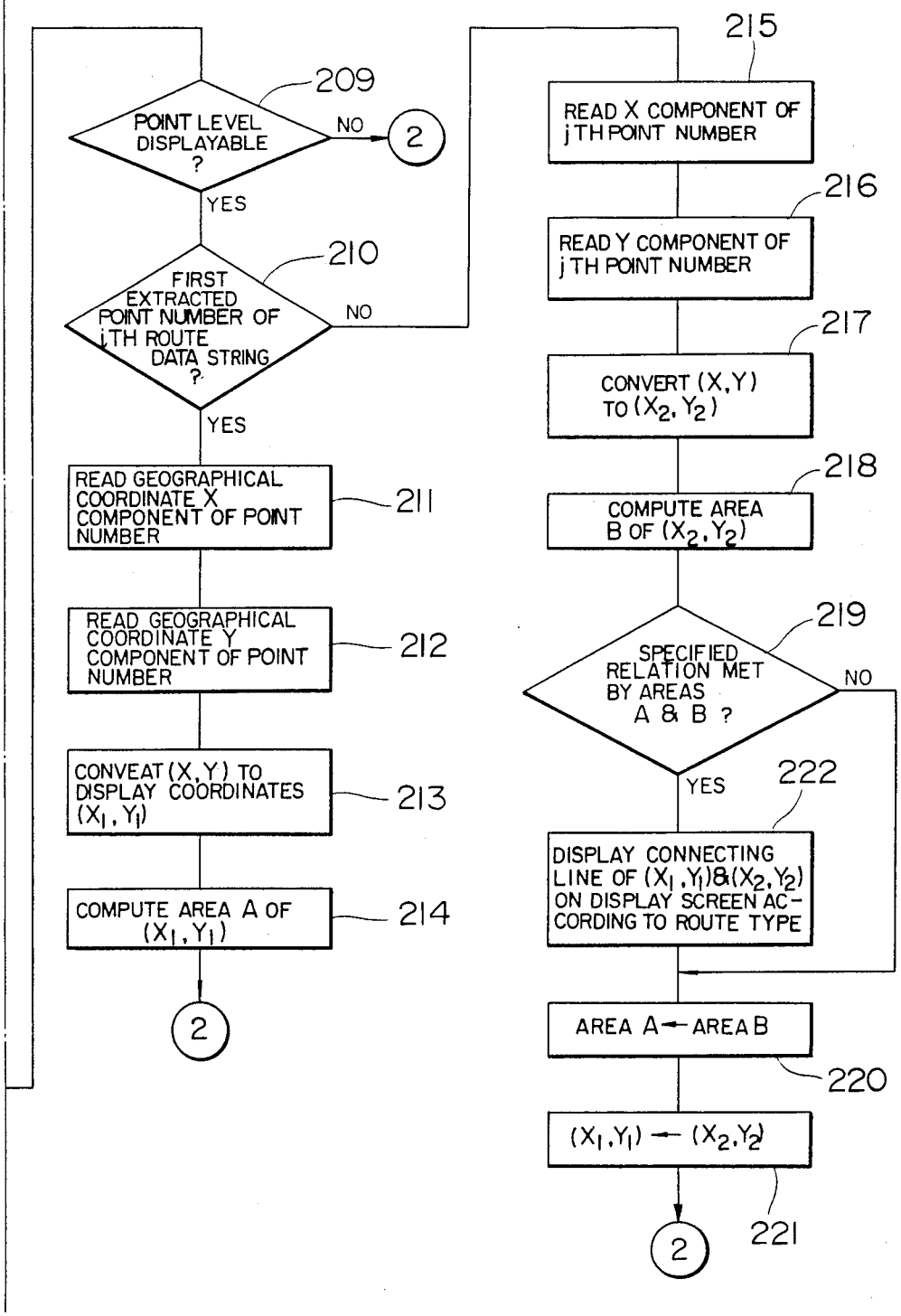

Thereafter, the same processing as mentioned above is successively performed for each of the route data strings so that when the processing of the N-th data string 28-N is completed, it is determined at the step 202 that the contents of all the pointers have been read out and the processing shown in FIG. 7a is ended.

From the foregoing description it will be seen that when the control unit 4 receives an enlargement command (designation) from selecting means, e.g., the operating section, those points having the corresponding levels to the commands are extracted from the routes of the route data strings D1 in the map data memory 3 which have those levels corresponding to the commands and the extracted points are subjected to the coordinate conversion thus determining the presence of a specified relation between the adjacent points and thereby displaying the connection between the points having the specified relation with a brightness corresponding to the type of the route.

In the above-mentioned construction, the relationship between the level data in the map data on the map data memory unit 3 and the size m set by the key operation is shown in Table (A) below.

TABLE (A)

| | Scale | | | | | |
|---|---|---|---|---|---|---|
| | 1/1,000,000 | 1/500,000 | 1/200,000 | 1/100,000 | 1/50,000 | 1/25,000 |
| Size m | 0 | 1 | 2 | 3 | 4 | 5 |
| Displayable level | 0 | 0,1 | 0,1,2 | 0,1,2,3 | 0,1,2,3,4 | 0,1,2,3,4,5 |

Specifically, when size corresponding to the scale of one million is set, only the routes and the points assigned with 0 as level data are selected as objects to be displayed on the CRT display 5. If the size 1 corresponding to the scale of one 500 thousandth, on the other hand, only those routes and points 0 or 1 in level data are selected as objects of display. The relationship between other sizes and display objects is also the same.

Normally, the relationship between the size and level is obtained as shown in Table (A). When the coarse key or the dense key is operated, however, the relationship between them for each key operation is updated as shown in Tables (B) and (C) below. Table (B) shows the case of the dense key operated once in each situation.

TABLE (B)

| Size m | 0 | 1 | 2 | 3 | 4 | 5 |
|---|---|---|---|---|---|---|
| Displayable level | 0 | 0 | 0,1 | 0,1,2 | 0,1,2,3 | 0,1,2,3,4 |

TABLE (C)

| Size m | 0 | 1 | 2 | 3 | 4 | 5 |
|---|---|---|---|---|---|---|
| Displayable level | 0,1 | 0,1,2 | 0,1,2,3 | 0,1,2,3,4 | 0,1,2,3,4,5 | 0,1,2,3,4,5 |

Specifically, in the case where a map corresponding to the size 3 is presently displayed, assume that the coarse key is operated once. The object of display which thus far been the points or routes having level 0, 1, 2 or 3 change to the points or routes having the level 0, 1 or 2, with the result that the points or routes of level 3 are omitted from the display objects, thereby making the displayed map coarse. Similarly, in the case where a map designated as size 3 is displayed, assume that the dense key is operated once. The points or routes of level 4 are newly added as display objects, thereby making the map dense.

Figures 1, 7B:
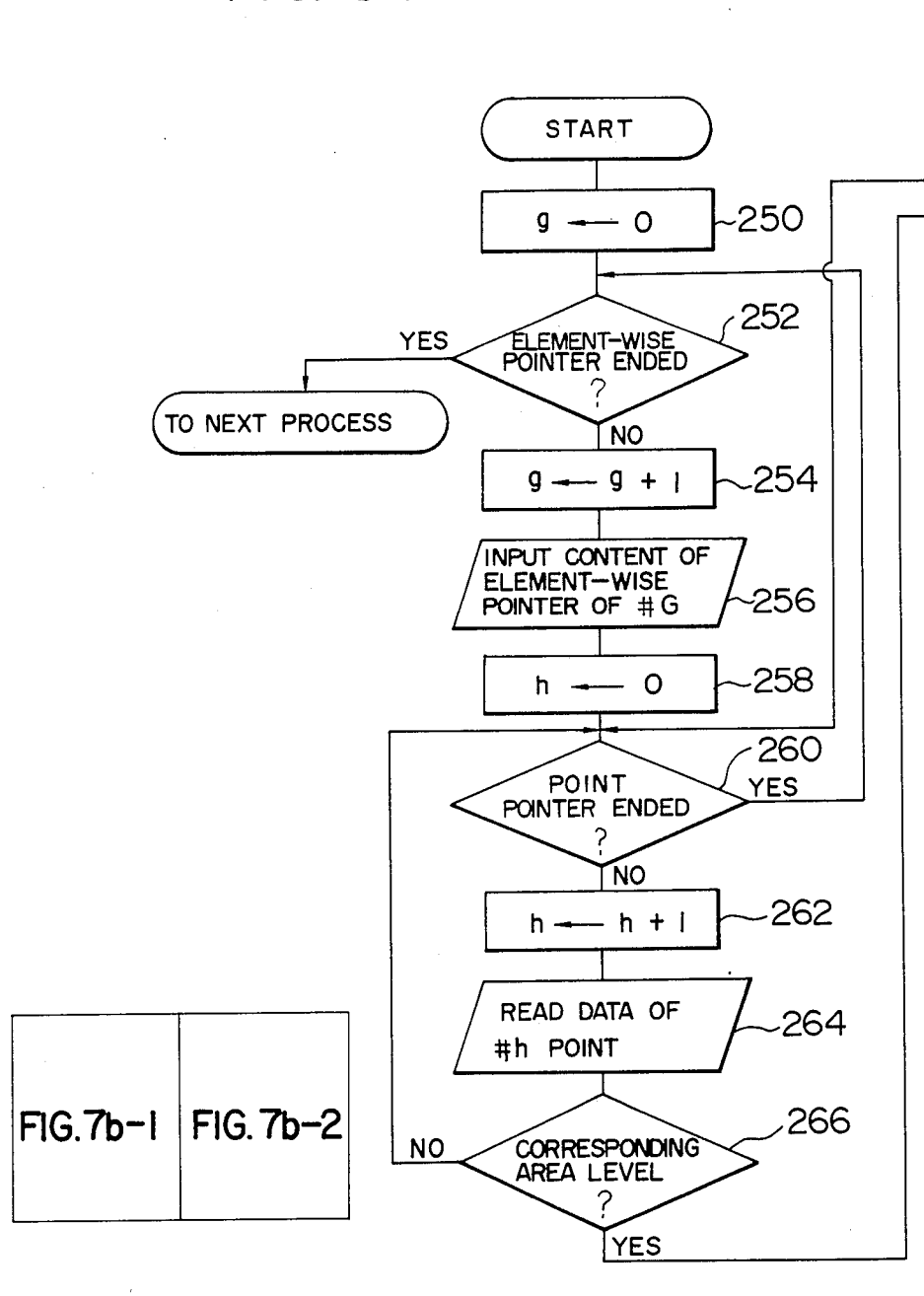
FIG. 7b is a flow chart for selecting and computing the required data from the relative coordinate data string.
Figures 2, 7B:
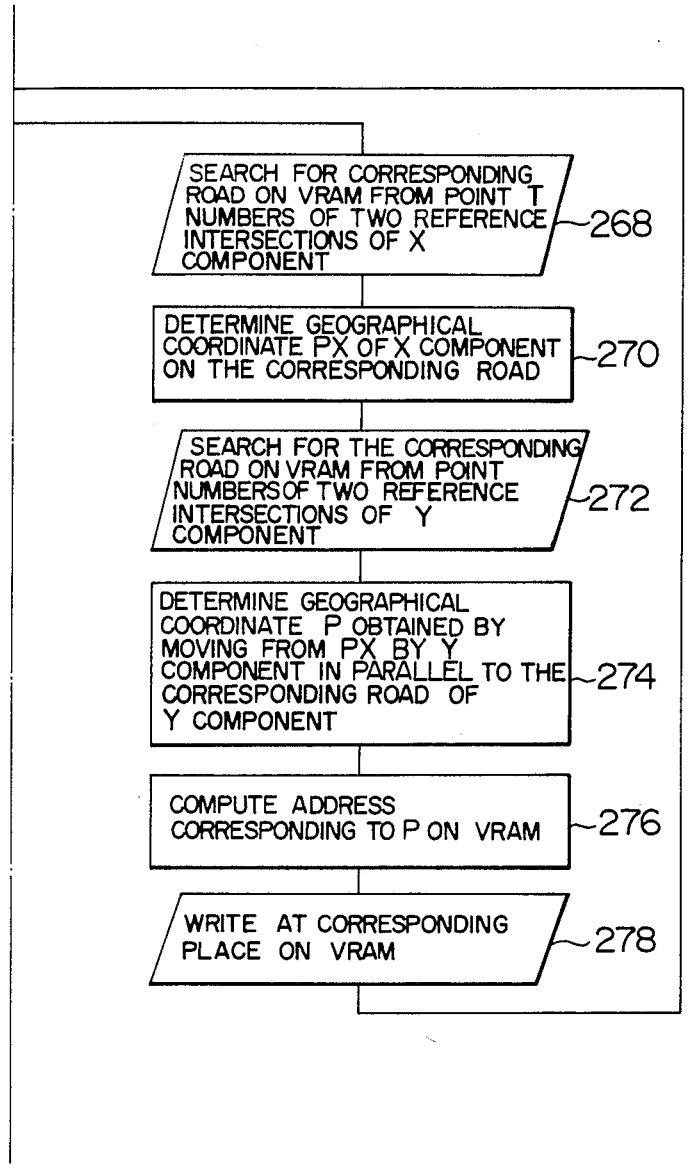

Now, in the flowchart of FIG. 6, an example of detailed processes corresponding to the steps 107 to 111 will be explained with reference to the flow chart of FIG. 7b.

In starting the processes, the counter q is cleared at the step 250. The step 252 decides whether or not the all the element pointers are checked. If they have not yet been checked, the decision is NO, so that the next step 254 increments the counter q. Then, at the step 256, the content of the g-th element pointer, that is, the data start address is input. In the presence of the first element pointer, the start address of the filling station data string is input, and if there is the second element point, the start address of the parking lot data string is entered.

Then, the step 258 clears the counter h. The step 260 decides whether or not all the point pointers 44a are checked. If they are not yet complete, the decision is NO, so that the next step 262 reads the data of the n-th point. Then, the step 266 decides whether or not the data read represents the area level to be displayed. This area level is already selected from the menu in the step 103 of the flowchart shown in FIG. 6.

If there is no related area level, the decision is NO, and the process is returned to the step 260. In other words, the subsequent processes are not executed as they do not represent any display areas.

Figure 3:
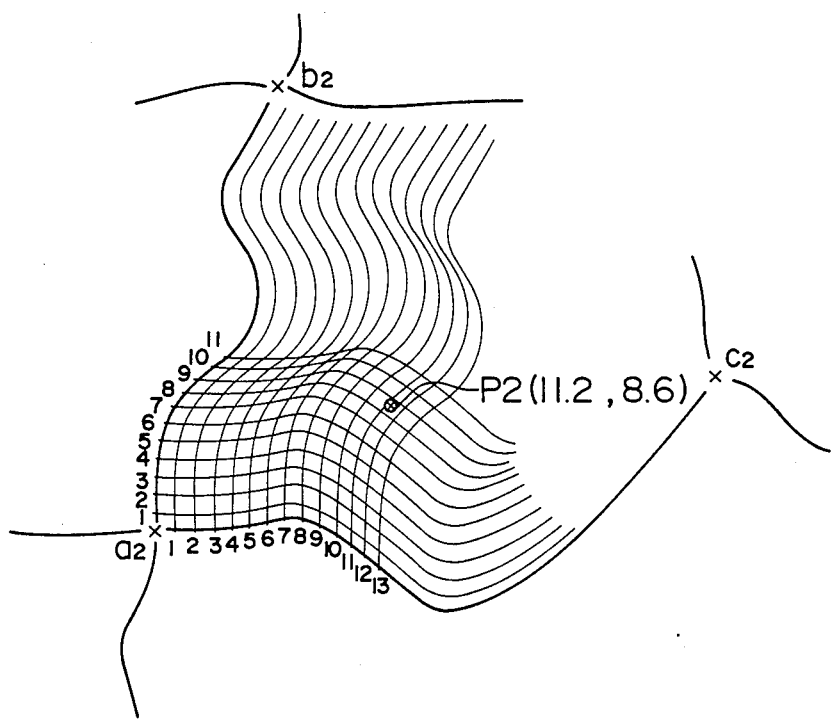
FIG. 3 is a similar diagram showing another example.

If the decision at the step 266 is YES, the step 268 searches the data on the two reference intersections indicating the section of the reference road of the X component for a reference road written in the VRAM. The step 270 then determines the geographical coordinate PX of the part corresponding to the X component along the displayed part of the road. In other words, the point PX shown in FIG. 3 is determined as the one represented by the distance 11.2 along the road from the reference intersection a2.

Then the step 272 searches the data on the two reference intersections indicating the section of the reference road of the Y component for a reference road written in the VRAM. Then the step 274 determines the geographical coordinate of the point P moved by the Y component along the reference road of the Y component from the position PX. In other words, the point 8.6 in the distance from the point PX shown in FIG. 3 in parallel to the road leading from intersections a2 to b2 providing the reference road of the Y component is determined as P (P2 in FIG. 3).

The above-mentioned steps 272 and 274 concern a data processing method represented by the X-Y coordinate. In the case where the distance and the right and left vector are used as shown in FIG. 2, however, a target is set near the road by vector check instead of the processes of steps 272 and 274. The step 276 then computes the address on the VRAM corresponding to the geographical coordinate of P. The step 278 then writes a symbol mark associated with the element such as "GS" if a filling station is involved, at the related place on the VRAM. As a consequence, the marks of the respective elements are indicated at the appropriate positions together with the roads on the CRT display unit 5. Then the process is returned to the step 260 for display of the next point.

Upon completion of checking the pointers of all the geographical points, the step 260 decides affirmative, following by the return to the step 252 for executing the process for the next element.

Upon completion of the execution of all the elements, the decision is made YES at the step 252, followed by the other processes.

In this way, the respective target points are displayed on the map that has so far contained the display of roads alone thereby to complete the map. In response to any input from the operating section 2, the above-mentioned processes are repeated.

Figure 11A:
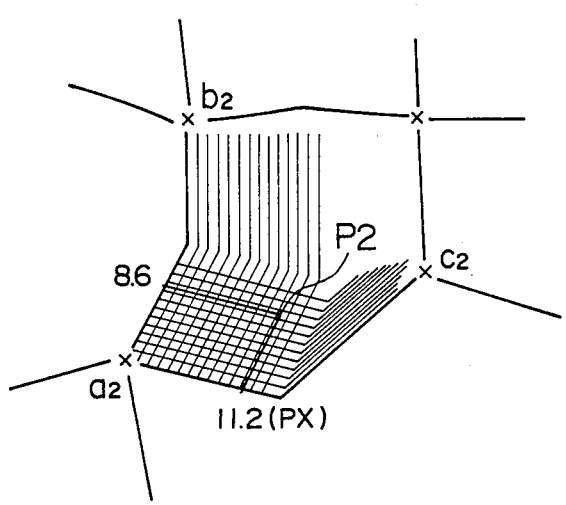
FIG. 11a is a diagram for explaining the conditions for shrinked display.
Figure 11B:
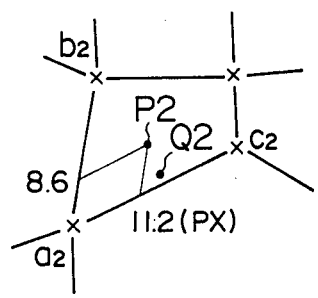
FIG. 11b is a diagram for explaining the conditions for a further shrinked display.

FIG. 11a shows the case meeting the requirement of a display which is shrunk from FIG. 3. First, the point PX expressed as "11.2" is determined with the road a2-c2 as a coordinate axis, and then the point P2 is determined by moving from PX along the road a2-b2 by 8.6 with this road as coordinate axis. Further, in the case where the scale has been compressed or shrunk as shown in FIG. 11b, the point P2 is determined also with the roads a2-c2 and a2-b2 as coordinate axes. If the geographical coordinate alone is resorted to for the point P2 as in the prior art, the position as shown by Q2 in the drawing is undesirably displayed. Unlike the point P2 shown in FIG. 3, this point is often considerably nearer to the road a2-c2, often confusing the driver.

Figure 12A:
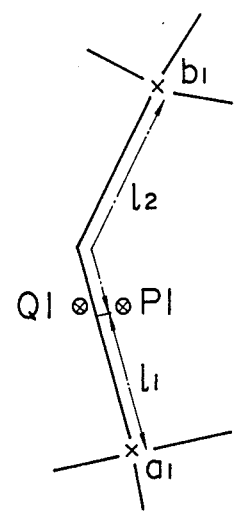
FIG. 12a is a diagram for explaining the shrinked display in another memory system.
Figure 12B:
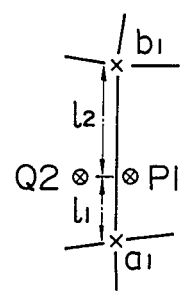
FIG. 12b is a diagram for explaining a further shrinked display.
Figure 13A:
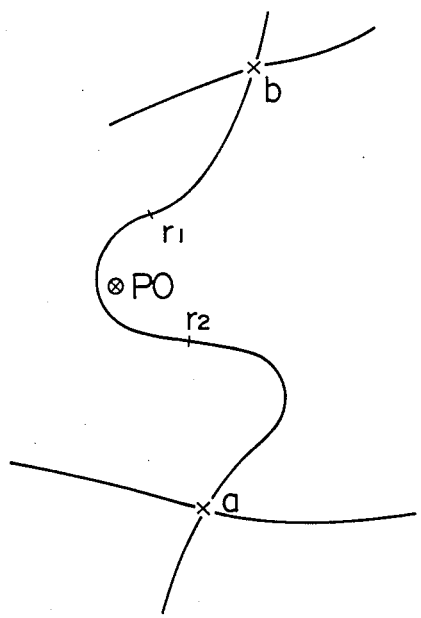
FIGS. 13a and 13b are diagrams for explaining conventional shrinking processes, respectively.
Figure 13B:
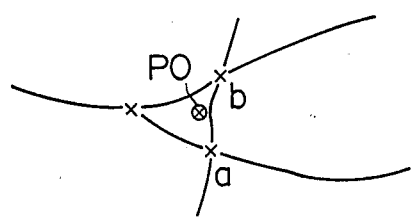

In the case where a geographical point is indicated by the distance from an intersection and the right and left vectors as in FIG. 2 shown above, a result of scale shrinking is shown in FIG. 12a. The point P1 is located on the right side of the intersection a1 away by the distance l1 therefrom, thus indicating the accurate position thereof to the driver. In the conventional geographical coordinate, the point Q1 is undesirably indicated. A further shrinking is shown in FIG. 12b, in which the point P1 also indicates the accurate position, but the conventional case, the same object is displayed on the opposite side and away from the road into the bargain, thus leading to a quite inaccurate display.

In the above-mentioned embodiments, the coordinates of the points P1 and P2 are stored as the distance from the intersections a1 and a2. Instead, the ratio of distance from a1 and b1 or from the roads a1 and b2 or c2 may be used for storage.

As described in detail above, according to the present invention, various targets may be displayed accurately against roads in various scales. Especially, this allows vehicle drivers on the roads to be capable of reaching a target point efficiently without being confused at all.

What is claimed is:

1. An electronic map display system for displaying a map, comprising:
first memory means for storing a plurality of point data indicative of points on the map, said point data stored with reference to a predetermined coordinate system;
second memory means for storing a target point data, indicative of a target point, said target point data indicating a positional relationship between said target point and at least two specific points on the map, each said specific point being one of said points on the map that has point data indicative thereof stored in said first memory means;

designating means for commmanding a scale of the map to be displayed;

first display control means, coupled to receive said point data from said first memory means and coupled to said designating means, for forming lines connecting said point data and converting said point data of said first memory means and said lines into first display data at a scale based on said scale commanded by said designating means;

second display control means for converting said target point data of said second memory means into second display data in accordance with a shape of a line connecting said at least two specific points; and display means, coupled to receive said first and second display data, for displaying a map based thereon.

2. A system according to claim 1, wherein there are four specific points, and said target point data of said second memory means includes means for indicating a target point with reference to a relative coordinate system defined by a first line connecting first and second ones of said specific points and a second line connecting third and fourth ones of said specific points; and said second display control means includes means for converting said target point data into said second display data in accordance with shapes of a first line connecting said first and second specific points and a second line connecting said third and fourth specific points.

3. A system according to claim 2, wherein said second memory means stores target point data comprising point indicating data indicating said first, second, third and fourth specific points and a first relative coordinate component of said target point on said first line and a second relative coordinate component of said target point on said second line.

4. A system according to claim 3, wherein said first specific point is the same point as said third specific point.

5. A system according to claim 4, wherein said second display control means includes means for converting said first and second relative coordinate components into components on lines extending from said first specific point toward said second specific point and from said first specific point toward said fourth specific point, and for including said lines as part of said first display data, wherein said display means includes means for displaying said target point on said display means according to said converted components.

* * * * *